United States Patent [19]

Collins

[11] 4,139,582

[45] Feb. 13, 1979

[54] CARBURETOR

[76] Inventor: Maynard H. Collins, 396 W. 25th St., San Bernardino, Calif. 92405

[21] Appl. No.: 860,686

[22] Filed: Dec. 15, 1977

[51] Int. Cl.² .................................................. F02M 7/02
[52] U.S. Cl. ...................................... 261/51; 261/53; 261/78 R; 261/121 A; 261/DIG. 39; 261/DIG. 64; 261/14 S; 123/122 AA
[58] Field of Search ................. 261/51, DIG. 64, 145, 261/53; 123/122 E, 122 AA; 261/DIG. 39, 78 R, 121 A

[56] References Cited

U.S. PATENT DOCUMENTS

| 1,124,949 | 1/1915 | Raymond | 261/DIG. 64 |
|---|---|---|---|
| 1,461,470 | 7/1923 | Ackley | 123/122 E |
| 1,630,048 | 5/1927 | Balachowsky et al. | 123/122 AA |
| 1,682,761 | 9/1928 | Linga | 261/51 |
| 1,887,044 | 11/1932 | Ryan et al. | 123/122 E |
| 2,297,736 | 10/1942 | Aymar | 261/51 |
| 3,042,016 | 7/1962 | Christian | 123/122 AA |
| 3,301,537 | 1/1967 | De Rugeris | 261/51 |
| 3,454,264 | 7/1969 | Sarto | 261/41 D |
| 3,680,846 | 8/1972 | Bickhaus et al. | 261/51 |

FOREIGN PATENT DOCUMENTS 2503597  7/1975  Fed. Rep. of Germany ........... 261/145

*Primary Examiner*—Tim R. Miles
*Attorney, Agent, or Firm*—Dana E. Keech

[57] ABSTRACT

A tubular grid exhaust fume conducting heat exchanger is mounted on a horizontal top face of the fuel mixture manifold of an internal combustion motor, said grid supporting vertically centrally thereon a cylindrical tubular fuel and air mixing housing the upper end of which supports and receives air from an air filter, the lower portion of which housing has a butterfly valve mounted therein and connects downwardly, directly through said heat exchanger with said fuel mixture manifold.

A jacketed and exhaust fume warmed fuel reserve canister provides a screen bottomed chamber which encloses a spherical plastic float and admits fuel axially downwardly into said chamber through a flow governing needle valve closed by said float when said float is lifted in said chamber by the fuel rising to its normal operating level. Fuel is delivered from the bottom of said canister to the middle of said throttle valve housing from which point it is diffused through the air stream flowing downwardly through said housing when the throttle is opened.

A unique air suction and mixing verturi tube and a raw fuel measuring needle valve are throttle manipulated jointly with the butterfly valve and are designed to greatly increase the percentage of the fuel used which is converted by combustion into power and a consequent marked reduction in the amounts of irritants exhausted into the atmosphere.

3 Claims, 8 Drawing Figures

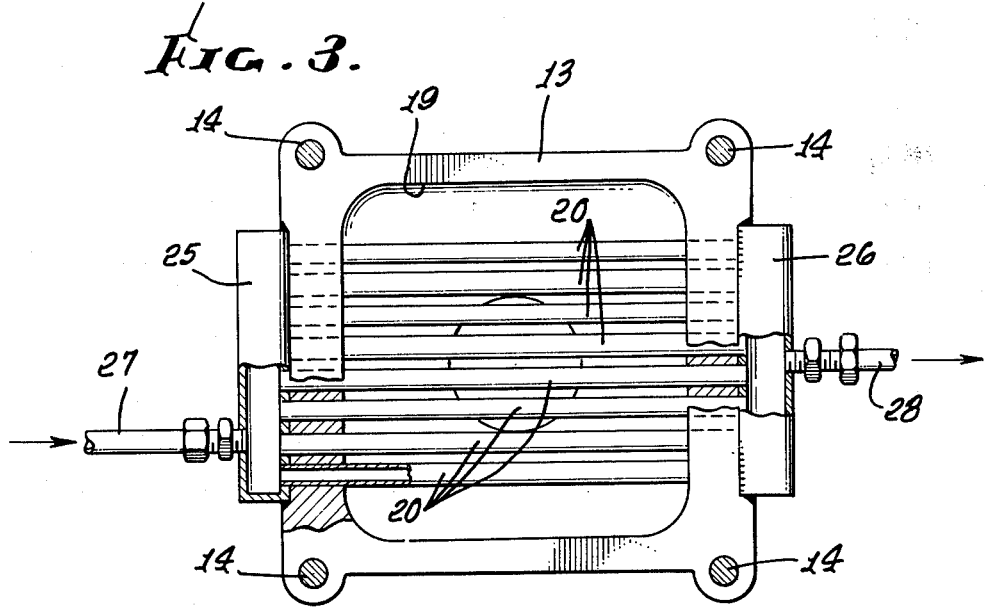
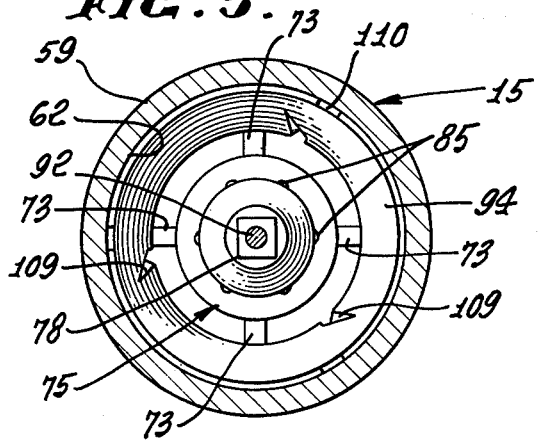
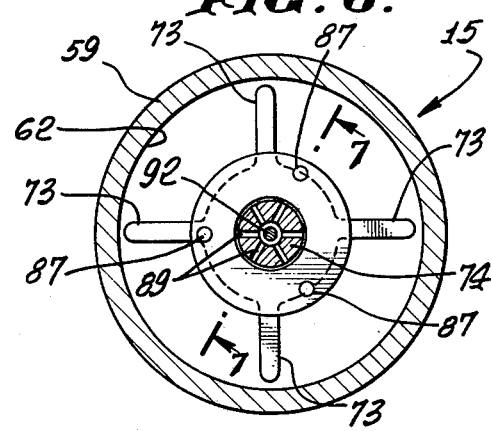
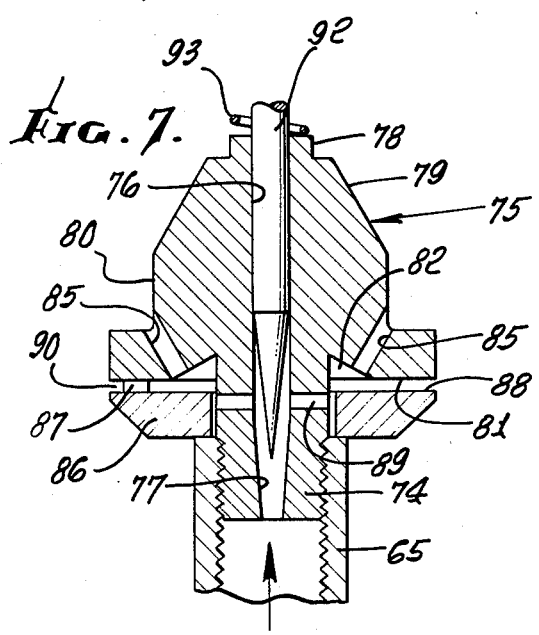
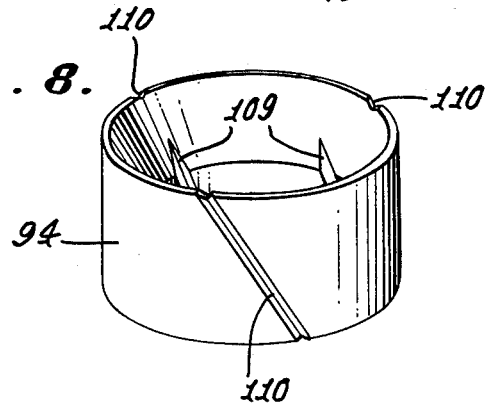

CARBURETOR

SUMMARY OF THE INVENTION

It is an object of the present invention to utilize the heat which is an unavoidable by-product in the operation of an internal combustion engine to facilitate to a maximum degree the preparation of a fuel and air mixture in the carburetor so that when said mixture is delivered to the fuel mixture manifold of the engine, the mixture will be free of raw fuel and subject to approximately instantaneous and complete combustion when compressed and ignited behind the pistons of the engine.

Another object is to accomplish the foregoing object efficiently at widely differing engine speeds while accurately measuring the varying quantities of fuel released to the engine through rapid accelerations and decelerations in speed whereby there is a minimum of unburned fuel released to the atmosphere through the exhaust fumes.

Still another object of the invention is to immediately reduce the flow of raw fuel to the air-fuel mixer in the carburetor to that bare minimum needed to maintain idling of the engine when the butterfly throttle valve is closed to the idling minimum.

A yet further object of the invention is to constrict and thus speed up the air stream being sucked into the air-fuel mixing device of the invention in a manner to increase its turbulence as it impinges upon a transverse area in which said fuel is thinly diffused thereby producing an intimate admixture of said air and fuel at the periphery of said area from which said mixture is subjected by venturi action to a marked decrease in pressure enhancing atomization and downward flow of the mixture through the butterfly valve and heat exchanger of the invention into the fuel mixture manifold of the engine.

BRIEF DESCRIPTION OF THE DRAWINGS

FIG. 3 is an upward looking bottom plan view taken on line 3—3 of FIG. 1 and illustrating the incoming fuel mixture heat exchanger of the invention.

FIG. 5 is a horizontal sectional detail view taken on the line 5—5 of FIG. 4.

FIG. 6 is a similar view taken on the line 6—6 of FIG. 4.

FIG. 7 is an enlarged vertical sectional detail view taken on the line 7—7 of FIG. 6.

FIG. 8 is a perspective detail view of the venturi tube of the air-fuel mixing means of the invention.

DETAILED DESCRIPTION OF THE PREFERRED EMBODIMENT

Figure 1:
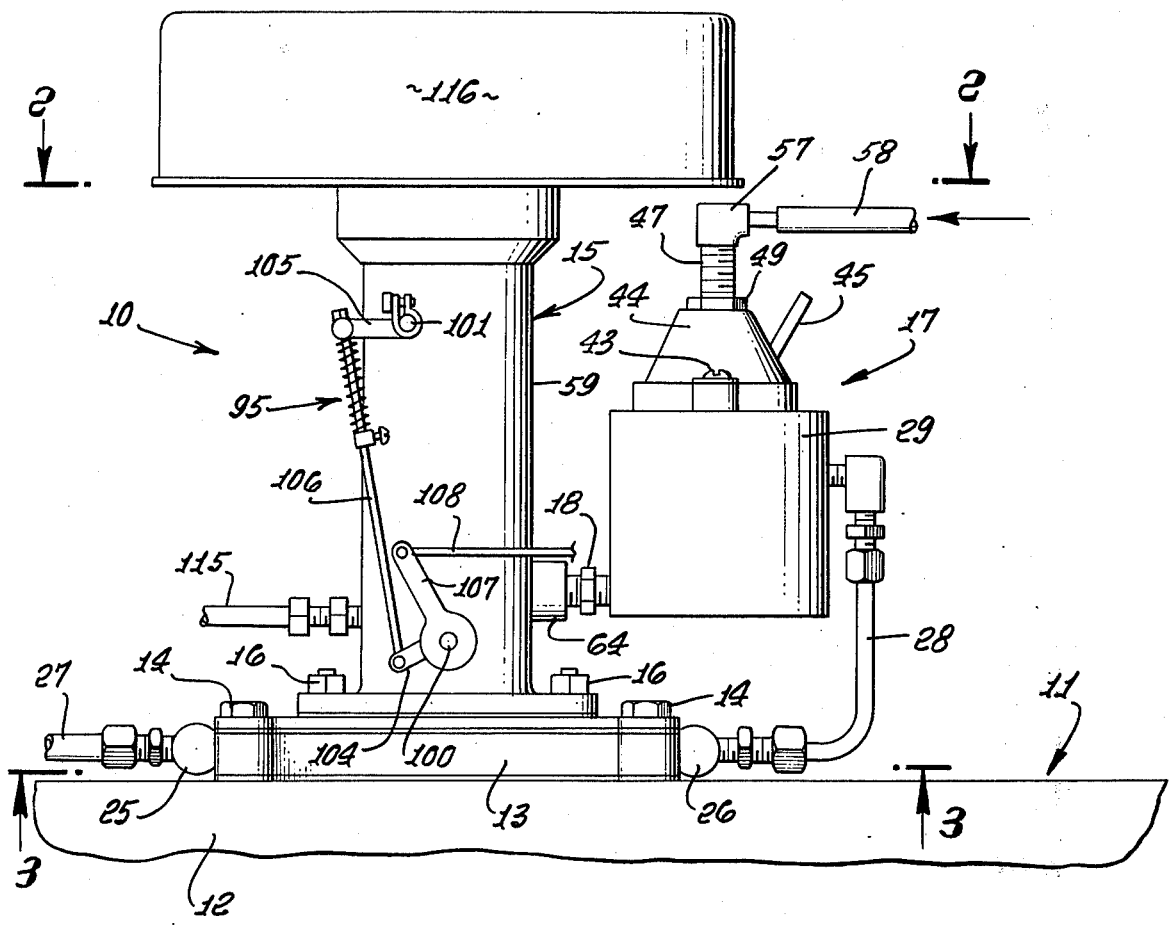
FIG. 1 is a diagrammatic side elevational view of a preferred embodiment of the invention mounted on a flat upper surface of the fuel mixture manifold of an internal combustion engine.
Figure 2:
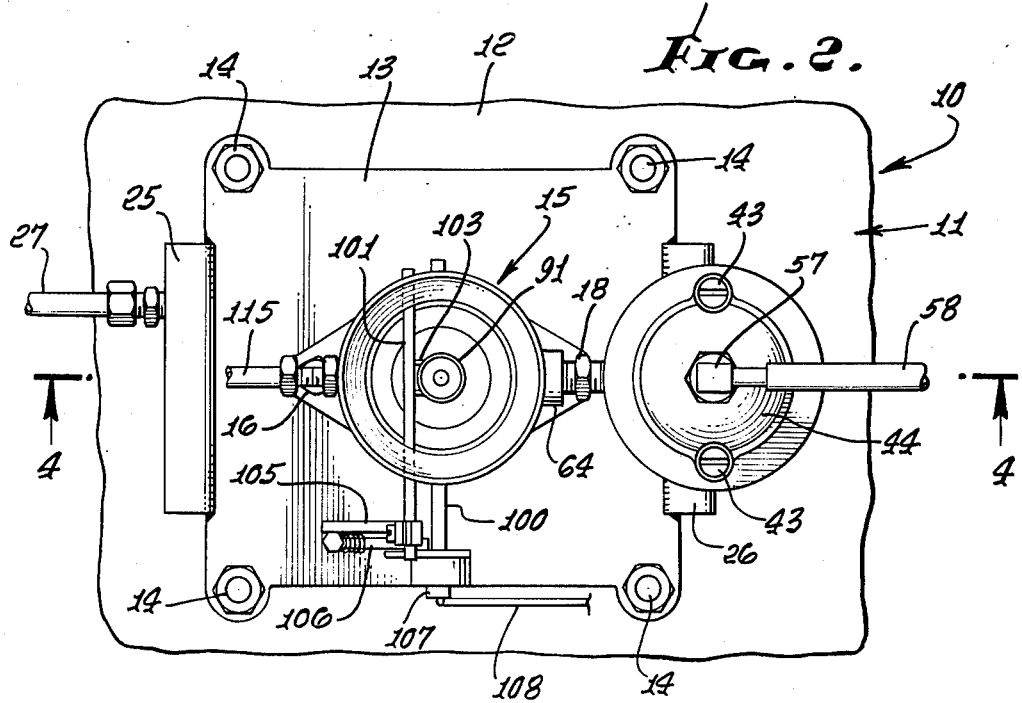
FIG. 2 is a plan view taken on the line 2—2 of FIG. 1.

The invention comprises a carburetor 10 which is primarily adapted to be associated with an internal combustion engine 11 of the reciprocating piston type commonly employed in propelling automotive vehicles.

Such an engine has a fuel air mixture manifold 12 for receiving such a mixture from the carburetor and an exhaust manifold (not shown) for conducting hot gases of combustion to a muffler for dissipation to the atmosphere.

The carburetor 10 includes three main elements, to wit: an exhaust fume-fuel mixture heat exchanger 13 fixed by bolts 14 to fuel mixture manifold 12; a cylindrical tubular air-fuel mixture producing and throttling device 15 mounted centrally by bolts 16 in an upright position on the heat exchanger 13; and a raw fuel reserve supply maintaining canister 17, which is supported on said device 15 by a connecting raw fuel feed pipe nipple 18.

The heat exchanger 13 has a closed inner chamber 19 through which a horizontal bank of parallel copper tubes 20 passes, these being connected at one end by an input header 25 and at the other end by an output header 26.

Connecting input heat exchanger header 25 with the exhaust manifold of engine 11 is an exhaust fume conduit 27. Connecting with output header 26 is an exhaust fume conduit 28 which connects, in a manner to be later pointed out, with canister 17.

Reserve fuel supply canister 17 is cylindrical and co-axially integrated with a closed peripheral jacket 29 into the upper end of which the terminal end of conduit 28 is tapped. The canister 17 and jacket 29 have a common bottom 30 in which a port 31 is provided to allow exhaust fumes delivered to jacket 29 through conduit 28 to escape to atmosphere after a substantial part of the heat of the incoming fumes has been absorbed by the canister and the fuel passing through said canister.

Aligned tapped holes 32 and 33 are provided in canister 17 and jacket 29 for fuel feed pipe nipple 18 to be screwed through and to thereby constitute a means for mounting canister 17 on mixture producing and throttling device 15 and provide for delivering a supply of raw fuel at all times to said device.

The upper end of canister 17 has a short internal counterbore 34 in which rests an out turned lip 35 formed on the upper end of a screening cup 40 so as to support the latter in said canister.

A screen 41 forms the bottom of said cup, said screen being spaced above canister bottom 30 to allow a free flow of fuel from said screen through nipple 18 to fuel mixture device 15.

Confined within cup 40 is a hollow spherical float 42, the purpose of which will shortly be made clear. Centrally positioned within counterbore 34 and held in place by screws 43 so as to rest on screening cup lip 35 is a conical needle valve mounting cap 44. Provided eccentrically in said cap is a small diameter air vent pipe 45.

A tapped hole 46 receives axially in said cap a threaded mount 47 for a downwardly hanging fuel flow governing needle valve 48, said valve being closed or opened by said float responsive to fluctuations of the level of fuel in said canister. The vertical setting of valve mount 47 in cap 44 is accomplished by manipulation of set nut 49.

An axial fuel passage 50 is bored downwardly through valve mount 47 which passage terminates at its lower end in a tapering valve seat 55, and at its upper end in a tapped counterbore 56 into which is screwed an elbow 57 connected by a hose 58 to the fuel pump (not shown) of engine 11.

The air-fuel mixture producing and throttling device 15 of the carburetor 10 includes a cylindrical tubular shell 59 which is secured at its lower end by bolts 16 to heat exchanger 13. Thus, the bore 60 of the shell 59 communicates directly downwardly through heat exchanger chamber 19 with the intake aperture 61 of the engine intake manifold 12.

At a height about equal to its diameter, the bore 60 merges with a counterbore 62, in a lower portion of which a pipe elbow 63 is integrally united with shell 59 to provide a tapped horizontal coupling 64 into which canister supporting nipple 18 screws, and a vertical internally threaded sleeve 65 located co-axially centrally within counterbore 62.

A narrow annular shoulder 70 is provided at the lower end of sleeve 65. Surrounding said sleeve and resting on said shoulder is a light taper coiled spring 71, the wider end being upward and yieldably supporting a flat spider washer 72 which slides loosely on sleeve 65 and has four radial legs 73, the tips of which closely sweep the shell counterbore 62.

Screwed downward into tapped sleeve 65 is the short threaded stem 74 of a needle auxilliary throttle valve mounting body 75, said body having a small cylindrical bore 76 which merges co-axially with a tapered valve seat 77 in stem 74.

The upper extremity of body 75 has a polygonal wrench fitting 78 for turning said body in assembling and disassembling the carburetor 10. A deep 30° bevelled annular face 79 is formed next below on said body this being followed by a right angled annular groove 80. On the radial plane of juncture between said body 75 and stem 74 said body is provided with a flat radial face 81 having an annular upward channel 82 with a triangular cross section immediately surrounding said stem. Six air orifices 85 are bored in said body inclining 30° inwardly to connect annular grooves 80 and 82.

Resting on the upper end of sleeve 65 and clamped thereagainst by screwing body 75 into said sleeve is a flat collar 86 having a 45° downward peripheral bevel, and having three spot studs 87 rising about 0.002" at equally spaced radial intervals from its flat upper face 88. The loose fit of collar 86 on stem 74 allows fuel flowing from bore 76 through six holes 89 drilled radially in said stem, at a level just below upper collar face 88, ample passage space for said fuel to enter the hublike annular channel 82 from which it has freedom to flow radially for 360° through the 0.002" thick fuel diffusion orifice 90 bounded on the top and bottom by the co-extensive peripheral flat areas of radial bottom face 81 on body 75 and radial upper face 88 of collar 86.

Provided with a deeply radially grooved head 91, a fuel flow governing steeply tapered needle valve 92 slidably fits bore 76 and is biased upwardly by coil spring 93 to allow a maximum freedom to fuel to flow through said valve. When said valve is depressed to extend into the tapered valve seat 77, however, this flow of fuel is restricted.

The valve mounting body 75 is surrounded by an air stream constricting venturi tube 94 which rests on the lightly spring supported spider washer 72. This results in the venturi tube 94 yielding to the down-flow of air-fuel mixture in the shell 59 when the engine 11 is running at high speed, thus increasing the passage space provided in the carburetor 10 for accommodating such a flow of fuel mixture.

Throttle linkage 95 provided for operating carburetor 10 in controlling engine 11 includes lower and upper valve actuating shafts 100 and 101 extending transversely through shell 59 and journalling in suitable aligned holes in said shell, the shaft 100 having mounted hereon a butterfly valve 102 and the shaft 101 having mounted hereon a pair of radial pins 103 which extend into opposite sides of the annular radial slot provided in the head 91 of valve 92.

Arms 104 and 105, mounted on extending ends of valve shafts 100 and 101 are pivotally connected to opposite ends of a spring extended but compressible pitman link 106. Another arm 107 is mounted on shaft 100 to connect through a link 108 to a foot pedal (not shown) for manipulating the butterfly valve 102 in the usual manner for controlling the operation of engine 11.

Venturi tube 94 is provided with spiral internal slots 109 and reversely pitched external spiral slots 110 for a purpose to be made clear later.

A pipe 115 is tapped into shell 59 directly opposite butterfly valve 102 for use in introducing heated air or exhaust fumes into the air-fuel mixture as will be explained in describing the operation of the invention.

Secured axially to the upper end of shell 59 is a conventional air filter 116 which removes all solid matter from the air before admitting it to the carburetor 10.

OPERATION

The reserve fuel supply float valve controlled canister 17 is itself constantly supplied with fuel flowing thereto through hose 58 which connects to the fuel pump (not shown) of engine 11. The float valve 48 shuts off this flow of fuel to canister 17 when the reserve supply of fuel in the canister reaches a level approximately as indicated by broken line 117 in FIG. 4. Owing to atmospheric pressure being maintained in canister 17 by the vent pipe 45, fuel will flow by gravity into elbow 63 and upwardly therein until stopped by needle valve 92 being depressed when the butterfly throttle valve 102 is closed as when engine 11 is idling.

To support idling of the engine, a minute stream of fuel is permitted to be sucked through needle valve 92 and be mixed with air drawn downwardly through venturi 94 to form a combustible mixture which will run the engine.

Figure 4:
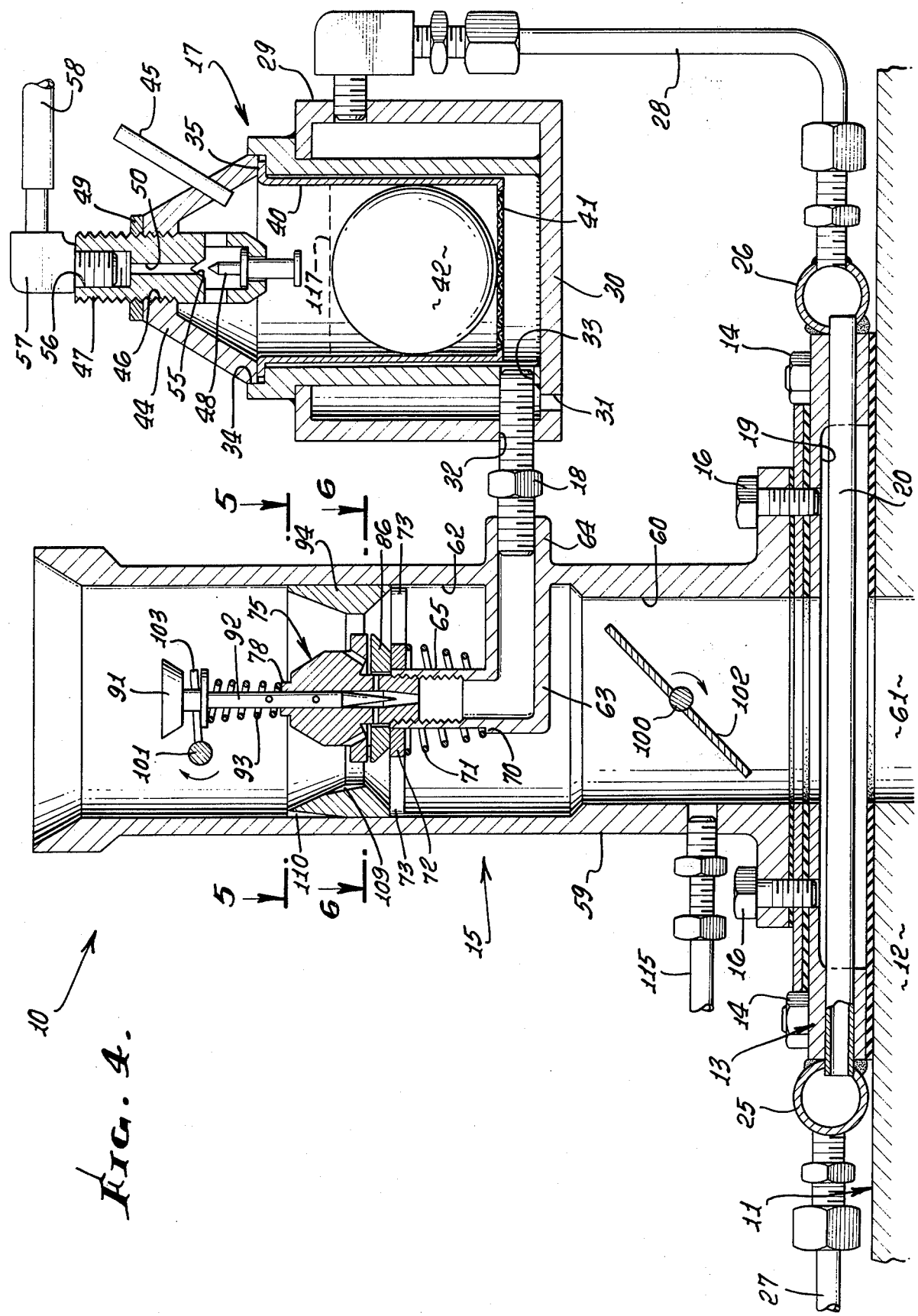
FIG. 4 is an enlarged diagrammatic lengthwise vertical sectional view taken on line 4—4 of FIG. 2, showing the throttle open but starting to be closed.

The idling positions of valves 92 and 102 are reached by actuating throttle linkage 95 by releasing pressure on the foot pedal resulting in valve shafts 100 and 101 being rotated clockwise to the limit allowable as indicated by the adjacent arrows in FIG. 4.

To accelerate the engine the accelerator pedal is depressed to reversely rotate valve shafts 100 and 101 thus opening both valves 92 and 102.

Prior to this happening, and during idling, a subatmospheric pressure is built up in the fuel mixture manifold 12. As the throttle is opened the suction in this manifold is communicated to the air-fuel mixer 15 of the carburetor 10 producing a downward rushing of air from the air filter 116 through the mixer 15 and into the engine. During its passage downward this air stream is compressed and then released by the venturi tube 94 to lower the air pressure, this semi-vacuum withdrawing fuel from the opened needle valve 92 through radial holes 89, then upwardly around the stem 74 into the annular channel 82 and thence radially 360° through fuel diffusion orifice 90.

During its travel through this tortuous path, the fuel thus diffused is being additionally diffused and mixed with air by air jets flowing downward through orifices 85 formed in plug 75, producing a high degree of turbulence at each of the points where one of these jets enters annular channel 82 formed upwardly in flat radial face 81.

The ultimate diffusion of fuel particles and uniform mixture of these with air occurs in the radial discharge of the air and fuel mixture from channel 82 through the 0.002" thick 360° nozzle jet 90 formed between the two flat juxtaposed faces 81 and 88 provided respectively by the body 75 and collar 86.

The high degree of physical diffusion of the air and fuel mixture produced by the invention is further enhanced by the warming of the reserve supply of fuel in the canister 17, the further heating of the final air fuel mixture as it is delivered to the engine 11, and, where desired, the delivery of combustion gases from the exhaust manifold through pipe 115 directly into the bore 60 of the air-fuel mixer 15.

What is claimed is:

1. In a vertical down draft carburetor the combination of:
    a vertical tubular housing adapted to receive filtered air at the upper end thereof and connect at its opposite end to an engine intake manifold to deliver thereto a fuel-air mixture;
    liquid fuel delivery elbow means terminating upwardly co-axially with said housing at a point approximately midway between said housing ends in an internally threaded tip;
    a co-axially bored bulbous fuel valve body having a cylindrical neck, the lower extremity of which is threaded to screw into said elbow tip to deliver fuel to said valve body bore, the lower end portion of said bore being tapered;
    a tapered fuel valve slidable vertically in said bore to govern the admission of fuel to the carburetor, there being a series of radial holes connecting said bore to the space immediately surrounding said neck at a level located approximately at the middle endwise of the smooth cylindrical surface of said neck;
    said fuel valve body extending radially from the upper end of said neck to form an annular flange, the peripheral portion of which has a flat under face, and an upward central portion of which is removed to form a downward facing annular channel immediately surrounding the upper end of the valve body neck,
    the upper main portion of said valve body having a conical shape separated at its lower border from said flange by a peripheral annular groove and the latter being connected with said annular channel by a series of downwardly converging air holes;
    a collar loosely fitting said valve stem and having flat upper and lower faces, the latter face resting on top of said elbow tip and the former face being spaced by suitable shim means from said flat under face of said radial flange of said valve body by a clearance in the general order of two one-thousandths of an inch, said collar being thus gripped firmly between said elbow tip and said valve body,
    there being a series of radial fuel passages bored in said stem at a level just beneath the upper face of said collar thereby reducing fuel forced through such fine orifices to a fine mist as it escapes upwardly from around said valve body neck into the turbulent air converging in said annular channel and then escapes through the annular fuel-air jet nozzle formed by the closely juxtaposed faces presented vis-a-vis by said valve body flange and said collar;
    butterfly valve means mounted in a lower portion of said housing for controlling delivery of air-fuel mixture to said engine; and
    means coordinately activating the fuel valve to effect a regulation of the richness of the fuel mixture compatible with the requirements of the engine under differing load conditions.

2. A combination as recited in claim 8 including
    a venturi tube occupying said housing surrounding said valve body with an upwardly spring-biased spider slideable on said elbow tip upwardly against said collar to position said venturi tube with its throat at idling speed opposite said annular fuel-air jet nozzle.

3. A combination as recited in claim 9 including
    a cup shaped head mounted on the upper end of said fuel valve in the mainstream of air entering the upper end of said carburetor housing to effect a perceptible degree of leaning of the mixture delivered to the engine by said carburetor at high engine speeds.

* * * * *